US007304241B2

(12) United States Patent
Trieb et al.

(10) Patent No.: US 7,304,241 B2
(45) Date of Patent: Dec. 4, 2007

(54) SWIVEL CONNECTOR, CABLE, AND ASSEMBLY

(76) Inventors: Karl-Heinz Trieb, Lindenstr. 15, D-91710 Gunzenhausen (DE); Jürgen Harreiss, Falkenweg 16, D-91710 Gunzenhausen (DE); Edgar Beier, Bahnhofstr. 3, D-73447 Oberkochen (DE)

( * ) Notice: Subject to any disclaimer, the term of this patent is extended or adjusted under 35 U.S.C. 154(b) by 0 days.

(21) Appl. No.: 10/943,461

(22) Filed: Sep. 17, 2004

(65) Prior Publication Data

US 2006/0060374 A1 Mar. 23, 2006

(51) Int. Cl.
*H02G 15/02* (2006.01)

(52) U.S. Cl. .................... 174/74 R; 174/81; 174/84 R; 174/86

(58) Field of Classification Search .............. 174/74 R, 174/75 D, 77 R, 80, 81, 84 R, 86, 88 R, 174/110 R, 113 R
See application file for complete search history.

(56) References Cited

U.S. PATENT DOCUMENTS

| | | | | |
|---|---|---|---|---|
| 29,444 | A * | 7/1860 | Alexander | 137/170 |
| 2,940,488 | A * | 6/1960 | Riley, Jr. | 81/429 |
| 3,802,301 | A * | 4/1974 | Peterson | 81/468 |
| 3,821,991 | A * | 7/1974 | Alexander | 173/180 |
| 4,188,801 | A * | 2/1980 | Hugh et al. | 464/106 |
| 4,568,145 | A | 2/1986 | Colin et al. | 350/96 |
| 4,869,686 | A * | 9/1989 | Michaels et al. | 439/455 |
| 5,043,949 | A * | 8/1991 | Shechter | 367/76 |
| 5,409,403 | A | 4/1995 | Falossi et al. | 439/668 |
| 5,530,203 | A * | 6/1996 | Adams et al. | 174/36 |
| 5,791,853 | A | 8/1998 | Danielson et al. | 414/280 |
| 5,841,290 | A * | 11/1998 | Bentzien et al. | 324/714 |
| 5,895,291 | A | 4/1999 | Furio et al. | 439/610 |
| 6,074,253 | A | 6/2000 | Brinchmann-Hansen | 439/624 |
| 6,123,568 | A * | 9/2000 | Bullough et al. | 439/445 |
| 6,227,881 | B1 | 5/2001 | Tharp et al. | 439/98 |
| 6,310,286 | B1 * | 10/2001 | Troxel et al. | 174/36 |
| 6,350,147 | B2 * | 2/2002 | Brownell et al. | 439/468 |
| 6,447,327 | B2 * | 9/2002 | Shimogama et al. | 439/470 |
| 6,455,799 | B1 | 9/2002 | Forslund et al. | 219/86.25 |
| 6,648,674 | B1 * | 11/2003 | Dobler | 439/460 |
| 6,863,549 | B2 * | 3/2005 | Brunker et al. | 439/108 |

FOREIGN PATENT DOCUMENTS

| | | |
|---|---|---|
| EP | 0 827 238 A2 | 3/1998 |
| EP | 1 255 324 A1 | 11/2002 |

* cited by examiner

*Primary Examiner*—William H. Mayo, III
(74) *Attorney, Agent, or Firm*—Allan M. Wheatcraft

(57) ABSTRACT

An assembly having a connector capable of rotating up to about +/−170 degrees; and a plurality of conductors, sized in the range of gauge 22 to gauge 26.

16 Claims, 10 Drawing Sheets

SWIVEL CONNECTOR, CABLE, AND ASSEMBLY

FIELD OF THE INVENTION

The present invention relates to swivel connectors, and more particularly, a cable, adapter, and assembly for use in connection with a swivel connector.

BACKGROUND OF THE INVENTION

A tool commonly known as a "nut runner" is depicted in FIG. 8, designated with reference numeral 100. In use, nut runner 100 is commonly connected to a right angle (90-degree) swivel connector 200, which in turn is connected to a handheld cable 30. During operation of nut runner 100, it is necessary for the tool to be rotated around its longitudinal axis, usually about 170 degrees in either direction (total rotation of about 340 degrees). This rotation thus also requires +/−170 degrees rotation of 90-degree swivel connector 200. During rotation, tremendous stress is introduced on the wires contained within handheld cable 300. The wires extend through 90-degree swivel connector 200 to make connection with nut runner 100. Rotation of nut runner 100 around 90 degree swivel connector 200 causes severe torsion and strain to the wires.

Known cables and 90-degree swivel connectors are not well suited for this use. The rotation and torsional stress to the wires causes damage and decreased performance and life for the device. A swivel connector, cable, and assembly that withstands the torsional forces to provide better performance and longer life is needed.

SUMMARY OF THE INVENTION

The present invention provides an assembly comprising a connector capable of rotating up to about +/−170 degrees; and a plurality of conductors, the conductors sized in the range of gauge 22 to gauge 26.

In another aspect, the invention provides a cable for use with a connector capable of rotating up to about +/−170 degrees, the cable comprising a plurality of conductors, the conductors sized in the range of gauge 22 to gauge 26.

In another aspect, the invention provides an adapter for connecting a cable having first conductors to a connector capable of rotating up to about +/−170 degrees, the adapter comprising a plurality of second conductors adapted to mate with the first conductors, the second conductors of the adapter sized in the range of gauge 22 to gauge 26.

In all of the above aspects of the invention, preferred embodiments include those wherein the conductors are power wires, wherein the conductors are signal wires, wherein the conductors are gauge 22, wherein the conductors are gauge 24, wherein the conductors are gauge 26, and wherein there are sixteen of the conductors, the conductors are power wires and the conductors are gauge 22.

DETAILED DESCRIPTION OF THE INVENTION

Figure 1:
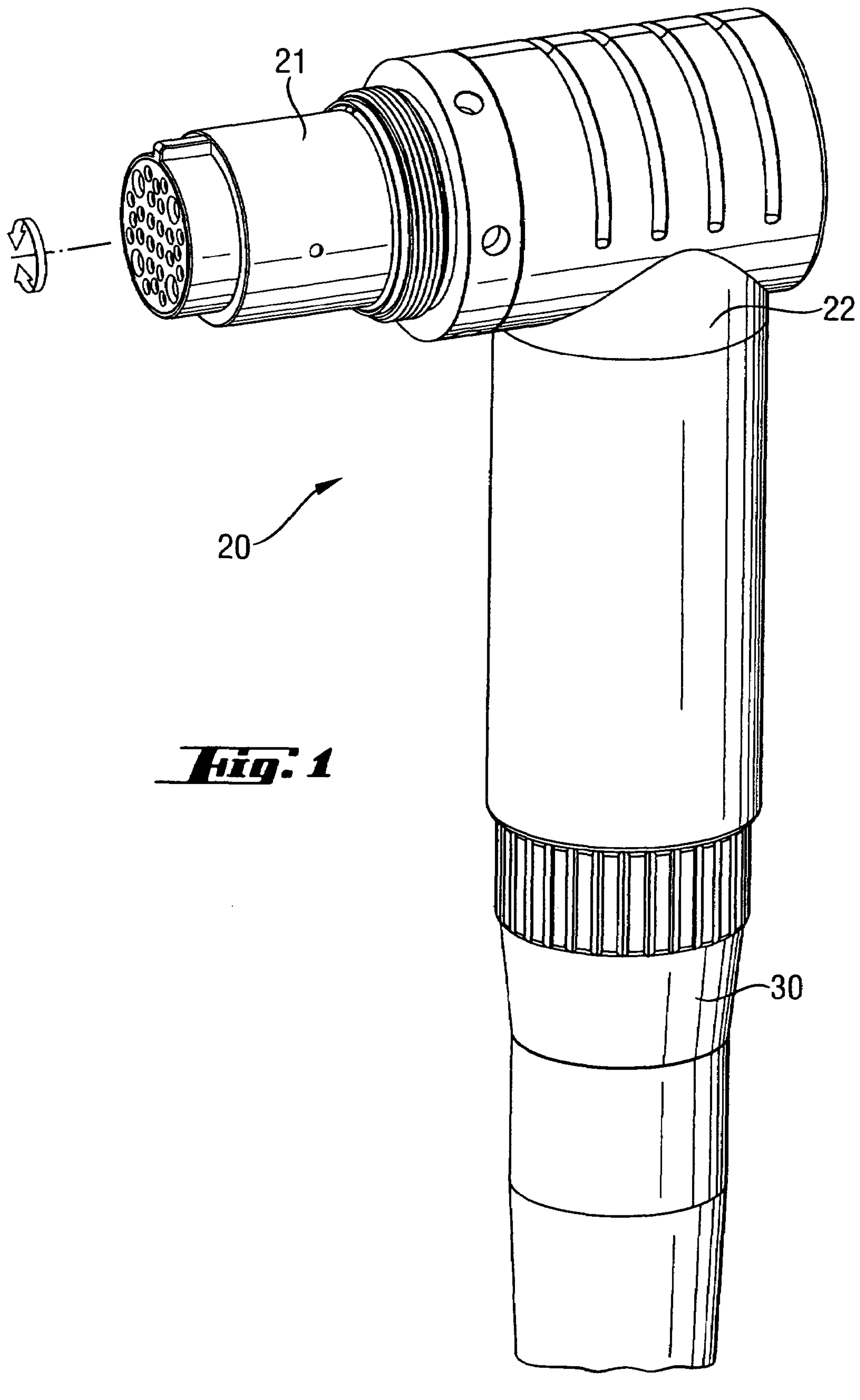
FIG. 1 is a perspective view of a 90-degree swivel connector and handheld cable.

FIG. 1 illustrates 90-degree swivel connector 20 connected to handheld cable 30. 90-degree swivel connector 20 comprises swivel connector 21 attached to a 90 degree housing 22. Swivel connector 21 is typically adapted to rotate +/−170 degrees around its axis as depicted by the arrow in FIG. 1. In one embodiment of the invention, cable 30 connects directly to swivel connector 21 to form an assembly.

Figure 1A:
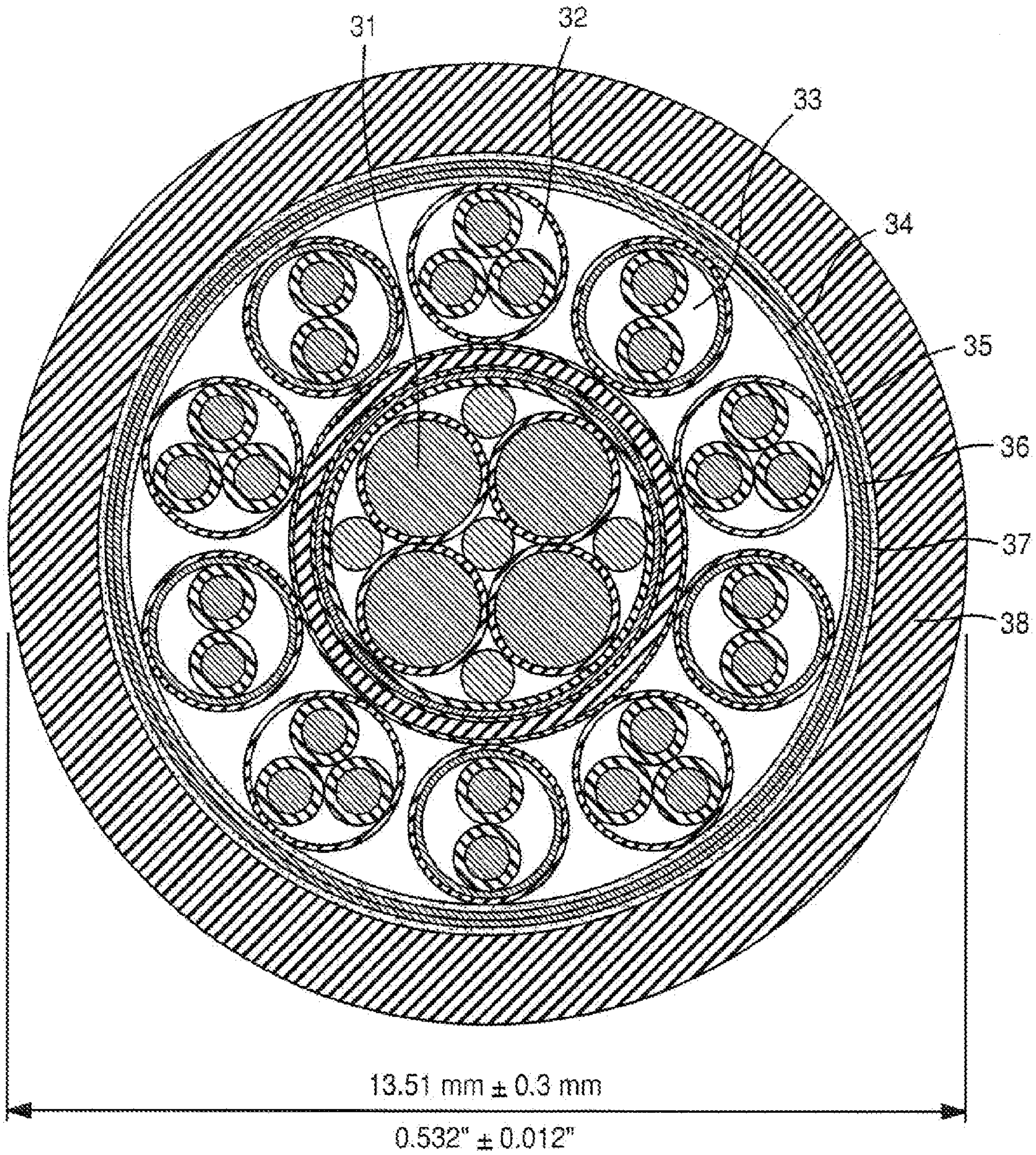
FIG. 1A (PRIOR ART)
FIG. 1A is a cross-sectional view of a prior art handheld cable.

FIG. 1*a* depicts a prior art cable used with 90-degree swivel connector 20. The prior art cable comprises four large power wires 31. Typically, these large power wires 31 are 14 to 16 gauge. It is these large power wires that are subject to wear and damage from the rotational stresses introduced by turning swivel connector 21. Other aspects of the prior art cable include twisted triads 32, twisted pairs 33, a binder material 34 such as Gore-Tex® tape, a served wire shield material 35 such as tinned copper, a served wire shield material 36 such as tinned copper, a binder material 37 such as Gore-Tex® tape, and a jacket material 38 such as polyurethane.

Figure 1B:
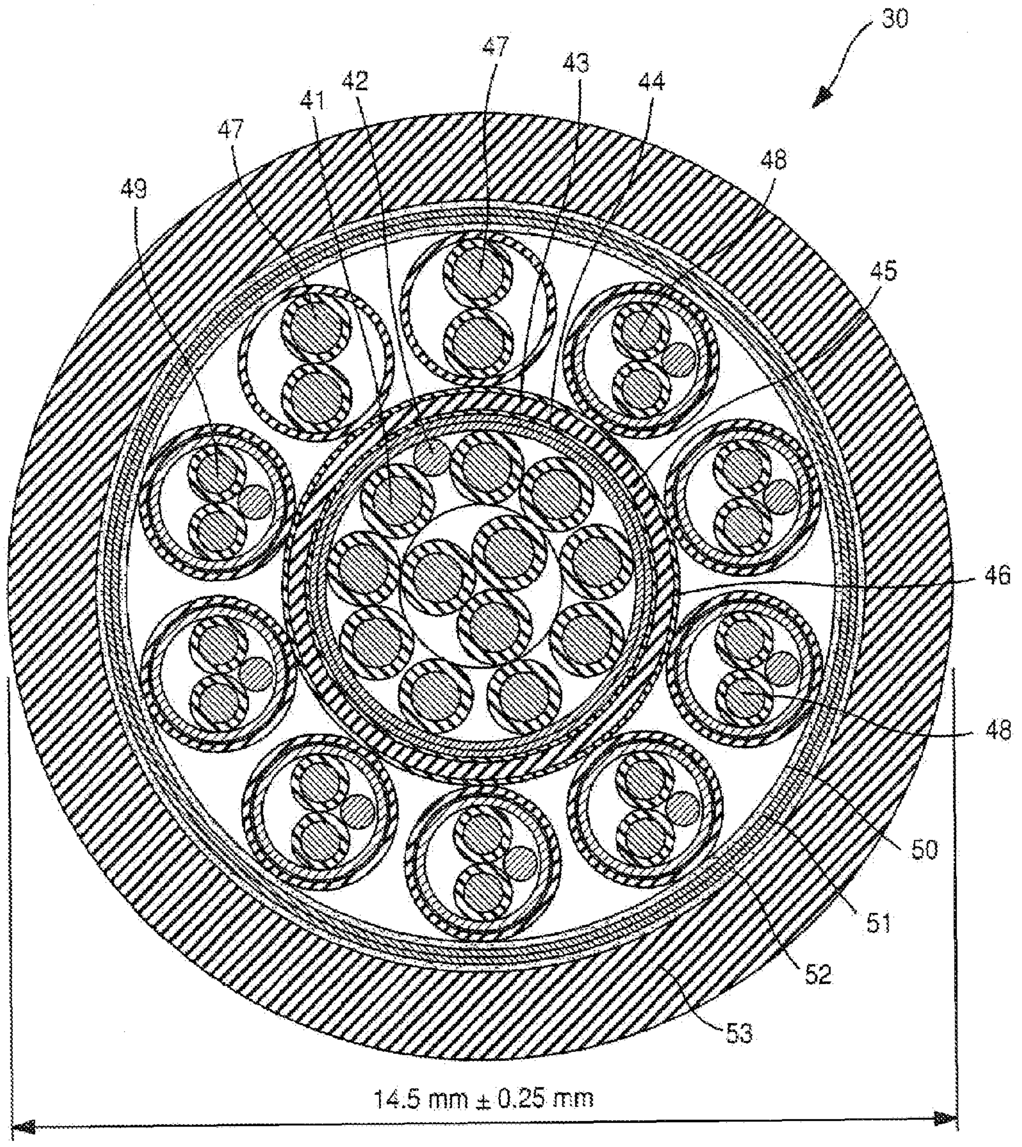
FIG. 1B is a cross-sectional view of a handheld cable according to an exemplary embodiment of the present invention.

FIG. 1*b* is a cross-sectional view of a handheld cable 30 according to an exemplary embodiment of the present invention. According to the present invention, large power wires 31 have been replaced by a plurality of smaller power lines 41. In the exemplary embodiment, the four large power wires 31 of the prior art have been replaced by sixteen smaller power wires 41. In the preferred embodiment illustrated, twelve of the smaller power wires are in the center of the cable 30, and four are located outside the center. This is done to avoid having to increase the diameter of the center portion of the cable.

According to the invention, small power wires 41 can be sized anywhere in the range of gauge 22 through gauge 26. Gauge 22 wires 41 are illustrated in the exemplary embodiment of FIG. 1*b*. The inventors have discovered that the smaller wires replacing the large power wires of the prior art provides significantly greater torsional stress resistance enabling better performances and longer life for the handheld cable 30 and 90-degree swivel connector 20. Surprisingly, up to five times longer life has been observed.

Other components of the inventive cable shown in FIG. 1*b* include a drain wire 42 such as high strength copper alloy, a double served wire shield material 43 such as tinned copper, a binder material 44 such as Gore-Tex® tape, a protective sheath material 45 such as polyurethane, a binder material 46 such as Gore-Tex® tape, two twisted pairs 47, four shielded twisted pairs 48, four shielded twisted pairs 49, a binder material 50 such as Gore-Tex® tape, a double served wire shield material 51 such as tinned copper, a binder material 52 such as Gore-Tex® tape, and a jacket material 53 such as polyurethane. These materials are all exemplary and other wire constructions may be used with the invention as will be recognized by those skilled in the art. In this embodiment of the invention, cable 30 connects directly to swivel connector 21 to form an assembly. A ferrule and strain relief boot may be used in combination with the cable.

Figure 2:
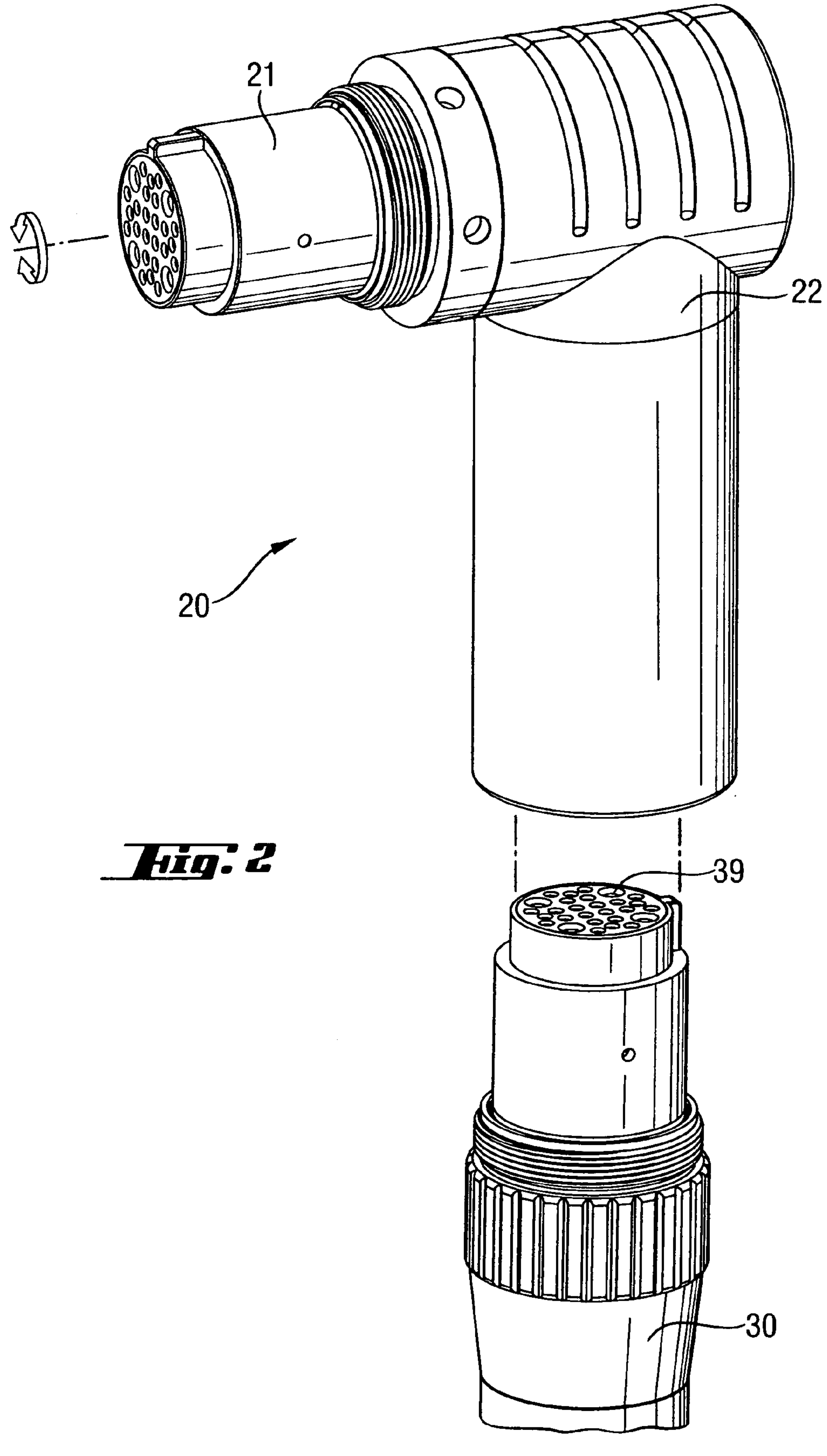
FIG. 2 is an exploded view of a 90-degree swivel connector and handheld cable according to an exemplary embodiment of the present invention.
Figure 3:
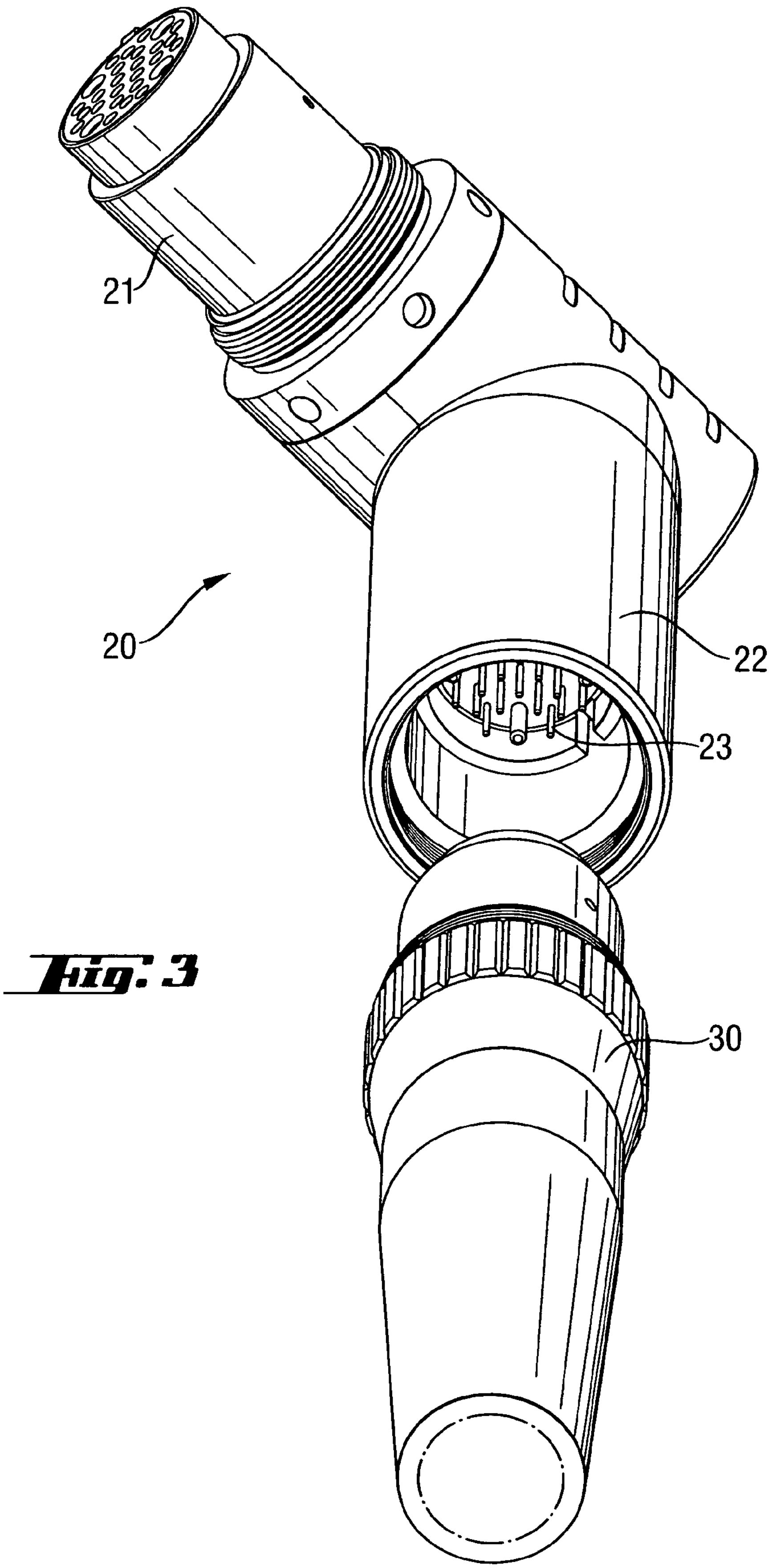
FIG. 3 is a perspective view of FIG. 2 rotated 90 degrees.

Thus, as described above, one embodiment of the present invention comprises the provision of a plurality of power wires 41 within handheld cable 30 to replace the use of fewer, larger power wires 31. FIGS. 2-6 illustrate another embodiment of the present invention. In this alternative embodiment of the invention, as shown in FIG. 2, handheld cable 30 is adapted to be mated with 90-degree swivel connector 20 by connection at the base of 90degree housing 22. With reference to FIGS. 2 and 3, this mating typically occurs by the coupling of prongs 23 contained within 90-degree housing 22 with openings 39 in the end of handheld cable 30.

Figure 4:
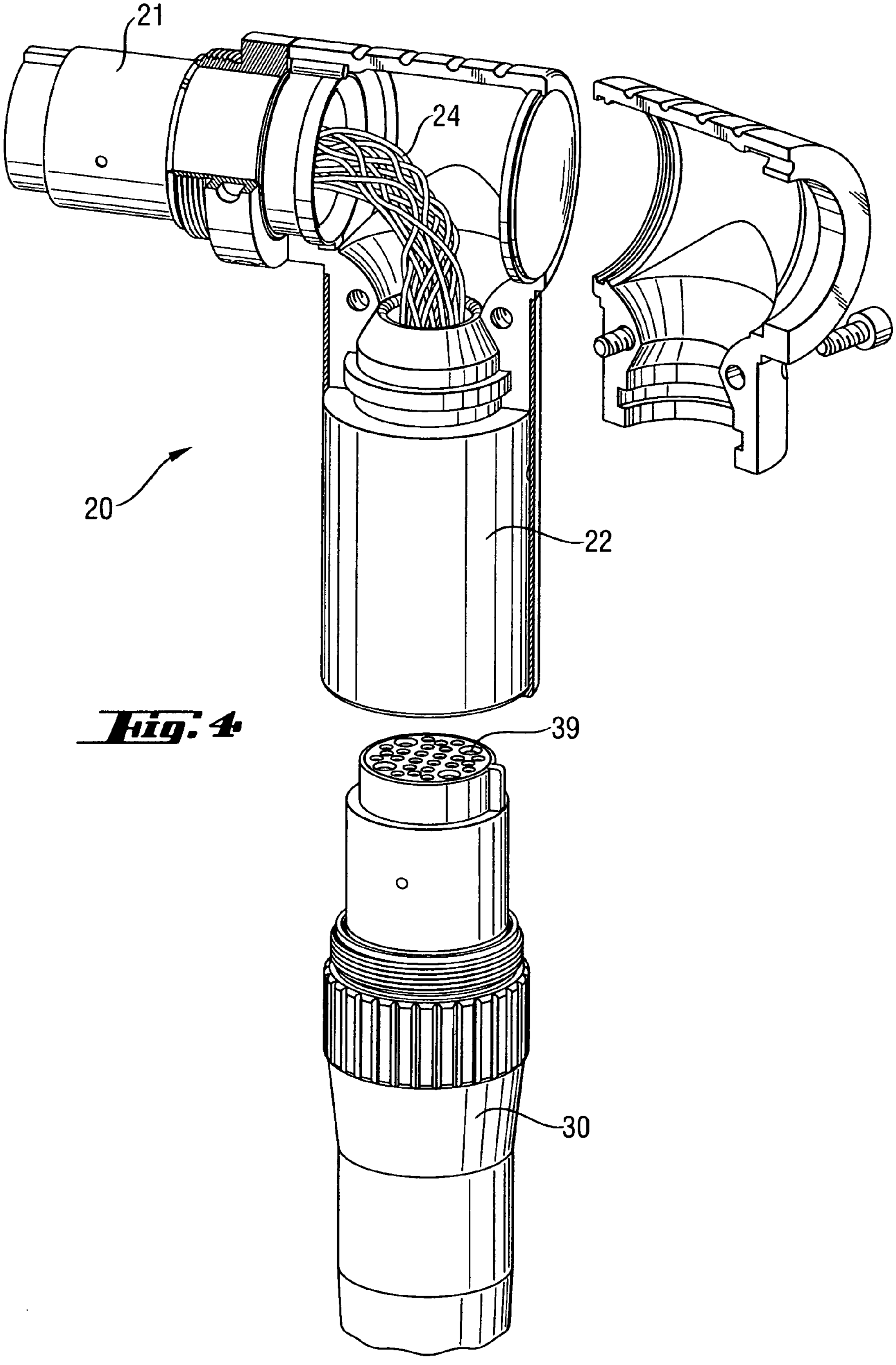
FIG. 4 is an exploded view of a 90-degree swivel connector and handheld cable according to an exemplary embodiment of the present invention.
Figure 5:
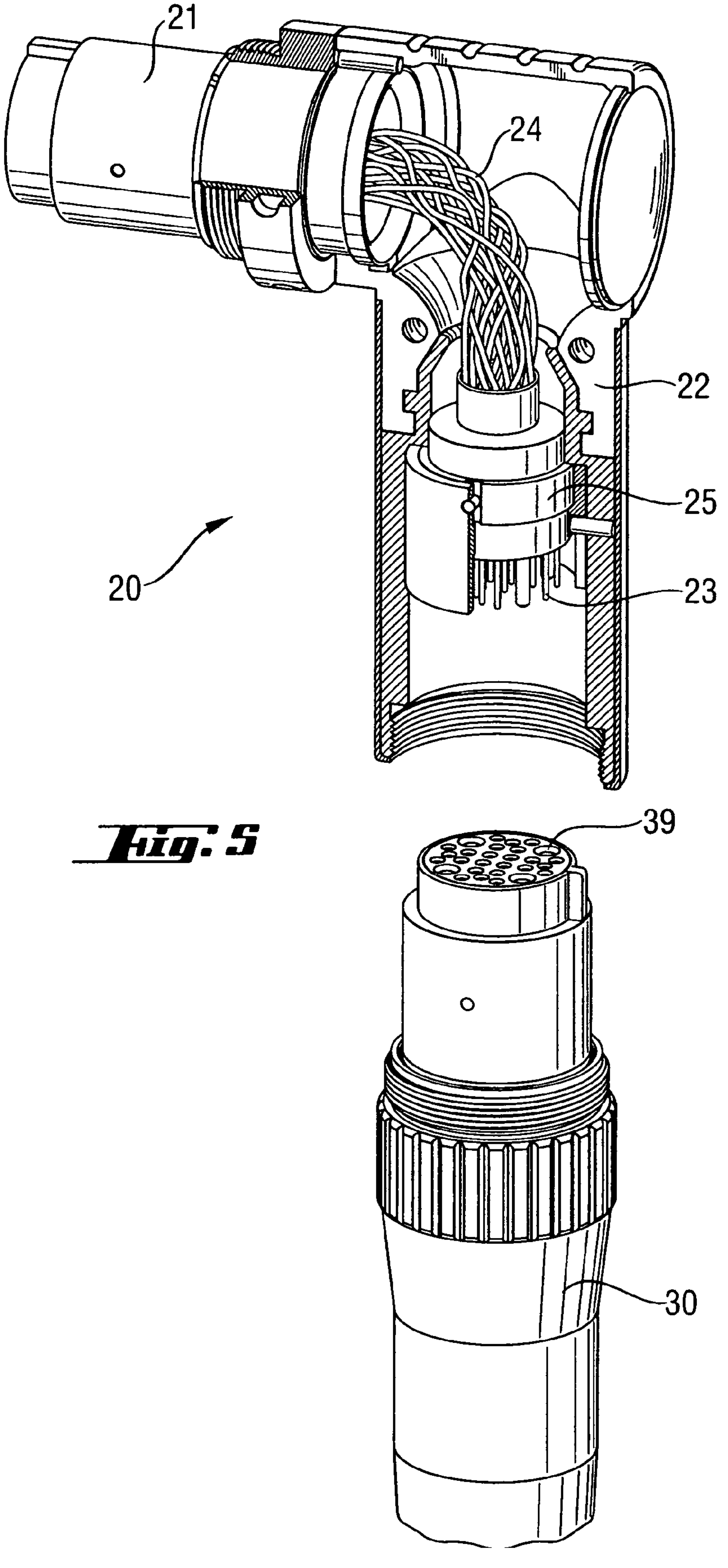
FIG. 5 is an exploded cross-sectional view of FIG. 4.

FIG. 4 shows an exploded of 90-degree swivel connector 20 in this embodiment. Shown within 90-degree swivel connector 20 is a plurality of connecting wires 24 adapted to mate with the plurality of power wires 41 provided in handheld cable 30 of the present invention. The plurality of connecting wires 24 are shown to make the 90-degree turn from the base of 90-degree housing 22 to swivel connector 21.

Figure 6:
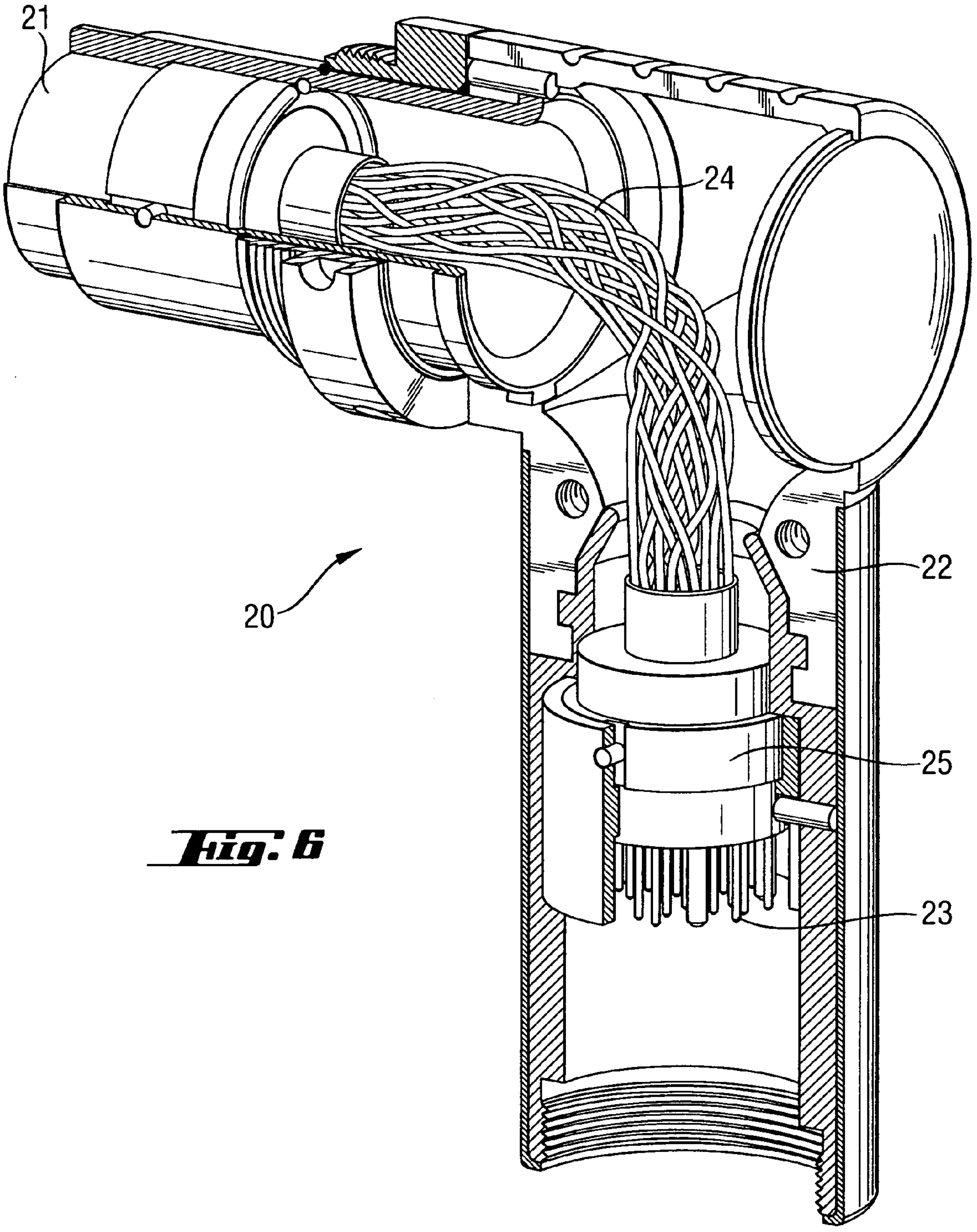
FIG. 6 is a cross-sectional view of an assembly according to an exemplary embodiment of the present invention.

In this embodiment, handheld cable 30 may simply comprise the standard, prior art cable with large power wires 31 as depicted in FIG. 3*a*. In this embodiment of the invention, however, swilvel connector 21, connecting wires 24, and connector 25 comprise an adapter provided within 90-degree swivel connector 20. The adapter provides for conversion of the signals from the four large power wires 31 within handheld cable 30 to a plurality of smaller, connecting wires 24. Thus, in this embodiment, a user is able to take advantage of the inventors' discovery that smaller wires are better adapted to handle the torsional stresses of rotation of swivel connector 21, but without having to replace existing handheld cable 30. The plurality of connecting wires 24 attached to adapter 25 are also sized in the range of gauge 22 to gauge 26. Of course, if necessary, the adapter embodiment of the invention can also be used with the cable embodiment of the invention, i.e., there may be a plurality of smaller wires in both the cable and the adapter. FIG. 6 is another view of the swivel connector 21 and the plurality of connecting wires 24 of the invention.

Figure 7:
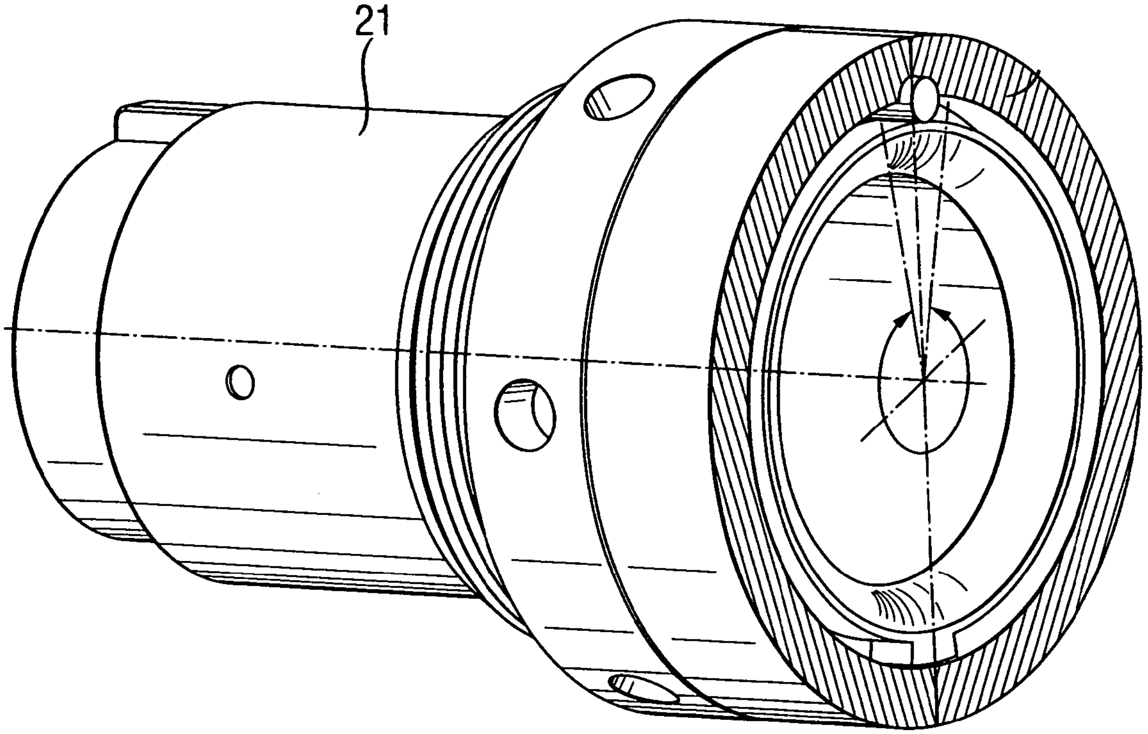
FIG. 7 is a perspective view of a swivel connector.
Figure 8:
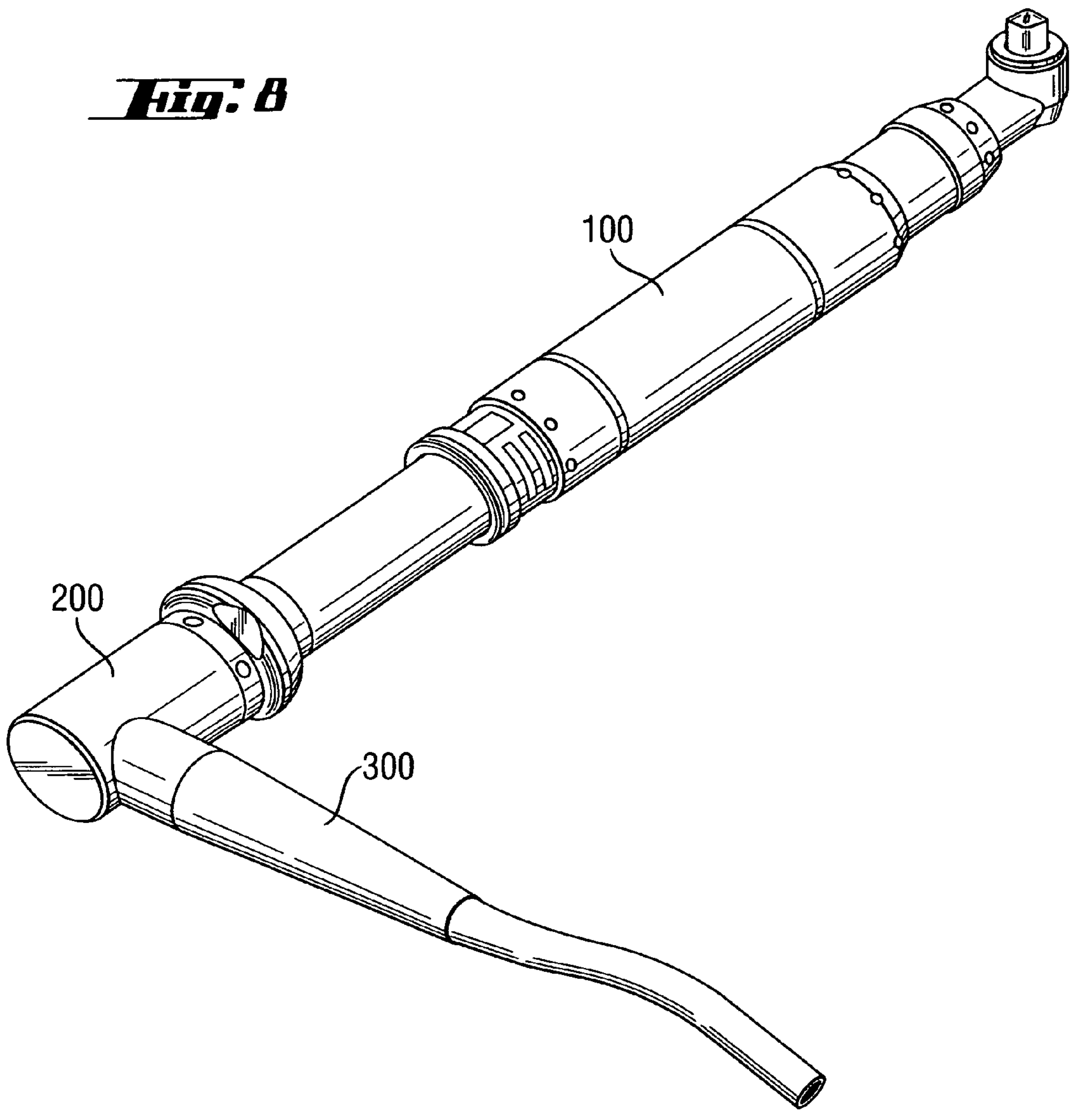
FIG. 8 is a perspective view of a nut runner connected to a 90-degree swivel connector connected to a handheld cable.

Although the invention has been described primarily in connection with a 90-degree swivel connector 20, the invention also has utility with other swivel connectors. For example, as shown in FIG. 7, swivel connector 21 may be used without 90-degree housing 22. Thus, a handheld cable 30 of the invention of the first embodiment herein might attach directly to the back of swivel connector 21 going straight in without a 90-degree turn. The swivel adapter is still adapted to rotate typically +/−170 degrees as shown by the arrows in FIG. 7. In addition, although the invention has been described in the preferred embodiment as replacing large conductors that are power wires with a plurality of smaller conductors that are power wires, the invention may also be applied to replacing large conductors that are signal wires with smaller conductors that are signal wires.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An assembly comprising:

(a) a housing (b) a swivel connector attached to said housing; said connector having a longitudinal axis and being capable of rotating along said longitudinal axis up to about +/−170 degrees with respect to said housing;

(c) a plurality of conductors, the conductors sized in the range of gauge 22 to gauge 26, disposed within said housing; and (d) said housing and said conductors defining an angle of approximately 90-degrees with respect to said longitudinal axis of said swivel connector.

2. The assembly of claim 1 wherein the conductors are power wires.

3. The assembly of claim 1 wherein the conductors are signal wires.

4. The of claim 1 wherein the conductors are gauge 22.

5. The assembly of claim 1 wherein the conductors are gauge 24.

6. The assembly of claim 1 wherein the conductors are gauge 26.

7. The assembly of claim 1 wherein there are sixteen of the conductors, the conductors are power wires, the conductors being gauge 22.

8. An assembly as claimed in claim 1, wherein said housing is an angled housing defining an angle with respect to said longitudinal axis.

9. An assembly as claimed in claim 1, wherein the assembly is adapted to be coupled to a nut runner tool.

10. A cable comprising a plurality of conductors, the conductors sized in the range of gauge 22 to gauge 26, said cable being adapted for use with a connector capable of rotating up to about +/−170 degrees.

11. The cable of claim 10 wherein the conductors are power wires.

12. The cable of claim 10 wherein the conductors are signal wires.

13. The cable of claim 10 wherein the conductors are gauge 22.

14. The cable of claim 10 wherein the conductors are gauge 24.

15. The cable of claim 10 wherein the conductors are gauge 26.

16. The cable of claim 10 wherein there are sixteen of the conductors, the conductors are power wires, the conductors being gauge 22.

* * * * *